(12) United States Patent
Lyons (10) Patent No.: US 10,598,371 B2
(45) Date of Patent: Mar. 24, 2020

(54) MODULAR ENCLOSURE WITH WATER MANAGEMENT MATING INTERFACES

(71) Applicant: Whelen Engineering Company, Inc., Chester, CT (US)

(72) Inventor: Jon H. Lyons, Haddam, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 231 days.

(21) Appl. No.: 15/789,312

(22) Filed: Oct. 20, 2017

(65) Prior Publication Data

US 2019/0120476 A1 Apr. 25, 2019

(51) Int. Cl.
| | |
|---|---|
| *F21V 31/00* | (2006.01) |
| *F21V 17/10* | (2006.01) |
| *F21V 17/06* | (2006.01) |
| *F21V 15/01* | (2006.01) |
| *F21S 4/28* | (2016.01) |
| *B60Q 1/46* | (2006.01) |
| *F21Y 103/20* | (2016.01) |
| *F21W 103/30* | (2018.01) |
| *F21Y 105/16* | (2016.01) |

(52) U.S. Cl.
CPC .............. *F21V 31/005* (2013.01); *B60Q 1/46* (2013.01); *F21S 4/28* (2016.01); *F21V 15/01* (2013.01); *F21V 17/06* (2013.01); *F21V 17/10* (2013.01); *F21W 2103/30* (2018.01); *F21Y 2103/20* (2016.08); *F21Y 2105/16* (2016.08)

(58) Field of Classification Search
CPC ........ F21V 31/005; F21V 15/01; F21V 17/06; F21V 17/10; F21S 4/28
See application file for complete search history.

(56) References Cited

U.S. PATENT DOCUMENTS

| | | | |
|---|---|---|---|
| 4,620,268 A | 10/1986 | Ferenc | |
| 5,091,828 A | 2/1992 | Jincks et al. | |
| 5,452,188 A | 9/1995 | Green et al. | |
| 6,081,191 A | 6/2000 | Green et al. | |
| 6,140,918 A | 10/2000 | Green et al. | |

(Continued)

FOREIGN PATENT DOCUMENTS

WO 2013/189992 A1 12/2013

OTHER PUBLICATIONS

International Search Report and Written Opinion dated Jan. 3, 2019 (PCT/US2018/056606).

*Primary Examiner* — Jong-Suk (James) Lee
*Assistant Examiner* — Christopher E Dunay
(74) *Attorney, Agent, or Firm* — Alix, Yale & Ristas, LLP (57) ABSTRACT

The modular enclosure with water management mating interfaces most fundamentally includes a mechanical connection which directs and obstructs water via various strategically positioned structures and gaps. One basic configuration includes a base having at least one end face and a periphery extending from the end face. The periphery includes an outward projecting lip. A plurality of retainers is secured to the base below the lip. The retainers and the lip define a channel extending along at least part of each side of the base. A dome having longitudinal sides that terminate in a bottom edge and an inward projecting flange that is spaced from the bottom edge is received by the flange in the channel to retain the dome to the base.

15 Claims, 13 Drawing Sheets

(56) References Cited

U.S. PATENT DOCUMENTS

| | | | |
|---|---|---|---|
| 6,425,681 B1* | 7/2002 | Agabekov | F21V 3/00 |
| | | | 362/223 |
| 7,611,270 B1 | 11/2009 | Lyons et al. | |
| 7,854,531 B1 | 12/2010 | Lyons | |
| 8,147,108 B2 | 4/2012 | Stein et al. | |
| 8,342,725 B2 | 1/2013 | Stein et al. | |
| 8,939,626 B2 | 1/2015 | Grote, Jr. et al. | |
| 8,944,654 B1 | 2/2015 | Lyons | |
| 9,705,597 B2 | 7/2017 | Latham et al. | |
| 2008/0232129 A1 | 9/2008 | Lyons | |
| 2010/0110683 A1* | 5/2010 | Fang | F21V 19/001 |
| | | | 362/249.02 |
| 2010/0118524 A1* | 5/2010 | Vonhoff | B29C 45/0053 |
| | | | 362/217.1 |
| 2011/0141722 A1* | 6/2011 | Acampora | F21V 3/00 |
| | | | 362/218 |
| 2011/0280020 A1* | 11/2011 | Chen | F21V 5/007 |
| | | | 362/294 |
| 2015/0345765 A1* | 12/2015 | Horst | F21V 31/005 |
| | | | 362/362 |
| 2017/0268756 A1* | 9/2017 | Chami | F21V 21/005 |

* cited by examiner

MODULAR ENCLOSURE WITH WATER MANAGEMENT MATING INTERFACES

BACKGROUND

The present disclosure relates to enclosures for warning light assemblies. More particularly, the present disclosure relates to enclosures used by warning light assemblies in the form of lightbars mounted on emergency vehicles.

Lightbars are used in environments where they are exposed to elements such as sunlight, wind, rain, ice, salt, snow, mud, and the like. The internal components of the lightbar are susceptible to damage if not properly protected from exposure to the elements. Consequently, lightbars are typically constructed to define a substantially sealed elongated cavity to protect the internal components. Vehicle-mounted lightbars are also exposed to high wind speeds, shock, vibration, and temperature extremes which make sealing the housing problematic.

Prior art lightbars have employed a modular approach where products of different lengths and color combinations are assembled to form a unitary base with complementary domes joined by a sealed periphery and sealed dividers. While these assemblies have proven commercially and technically successful, they can be expensive to manufacture and assemble, difficult to service, and over time the seals between domes and at the periphery are prone to leakage.

There is a need for a new water management technology and approach for an enclosure that obstructs water from entering a warning light assembly, provides pathways for water to exit the assembly, and is cost-effective to implement.

SUMMARY OF THE INVENTION

The modular enclosure with water management mating interfaces (hereafter, "lightbar enclosure") most fundamentally includes a mechanical connection made at the periphery of the lightbar enclosure which directs and obstructs water via various strategically positioned structures and gaps. The lightbar enclosure is arranged to take advantage of the force of gravity and a Venturi-like effect created by air flow around the enclosure.

One basic configuration of the lightbar enclosure includes a base having at least one end face and a periphery extending from the end face. The periphery includes an outward projecting lip. A plurality of retainers is secured to the base below the lip. The retainers and the lip define a channel extending along at least part of each side of the base. The light bar enclosure is enclosed by a dome having longitudinal sides that terminate in a bottom edge and an inward projecting flange that is spaced from the bottom edge. The flange is received in the channel to retain the dome to the base.

Each retainer of the lightbar enclosure includes a border that is substantially perpendicular to the lip and is spaced apart from a bottom surface of the lip to define a drain cavity. In the arrangement described above, the flange is engaged in a surface-to-surface relationship with the lip and the border is in a surface-to-surface relationship with the bottom edge. In one embodiment, the surface-to-surface relationship of the flange and the lip is substantially perpendicular to the surface-to-surface relationship of the border and the bottom edge.

In one embodiment, there is a plurality of modular bases positioned in a side-by-side arrangement. In this configuration, a joint is defined between each base. A passage is defined between each retainer. The joints are longitudinally offset from each passage to obstruct water entering the lightbar enclosure and provide pathways for water to exit the lightbar enclosure.

One embodiment includes a method of manufacturing a warning light assembly. The method comprises providing a base having an outwardly projecting lip. A plurality of retainers is secured to the base to define a channel between the base and the retainers. A dome is positioned above the base. The dome terminates in a bottom edge and an inward projecting flange spaced from the bottom edge. The flange is secured in the channel to retain the dome to the base.

BRIEF DESCRIPTION OF THE DRAWINGS

Aspects of a preferred embodiment will be described in reference to the drawings, wherein like numerals reflect like elements.

DETAILED DESCRIPTION

The modular enclosure with water management mating interfaces is a subassembly that is illustrated in the context of a warning light assembly known in the art as a lightbar (hereafter, "the lightbar enclosure"). The internal components of a lightbar are fully described in U.S. patent application Ser. No. 11/724,371, filed Mar. 14, 2007, the contents of which are incorporated by reference. Since most of the internal components of a lightbar are not directly relevant to the disclosed lightbar enclosure, they are omitted from the Figures.

One embodiment of the lightbar enclosure according to aspects of the disclosure will now be described with reference to FIGS. 1A-11. The lightbar enclosure will generally be referred to by the reference numeral 10. Various materials, methods of construction, methods of manufacture, and methods of fastening will be discussed in the context of the disclosed embodiment. Those skilled in the art will recognize known substitutes for the materials, manufacturing methods, and fastening methods, all of which are contemplated as compatible with the disclosed embodiment and are intended to be encompassed by the appended claims.

One object of the lightbar enclosure 10 is to reduce the amount of seals used to protect the electrical and optical components of a lightbar from moisture. The disclosed lightbar enclosure 10 incorporates strategically positioned structures and gaps designed to obstruct and drain water from external surroundings away from the internal components of a lightbar. Another object of the disclosed lightbar enclosure 10 is to facilitate automation of the assembly of a lightbar. Though the foregoing structures and relationships are discussed in the context of an enclosure for a lightbar, those skilled in the art will recognize that the disclosed structures and relationships are also applicable to enclosures in general where it is desirable to prevent water from entering an interior.

Figure 1A:
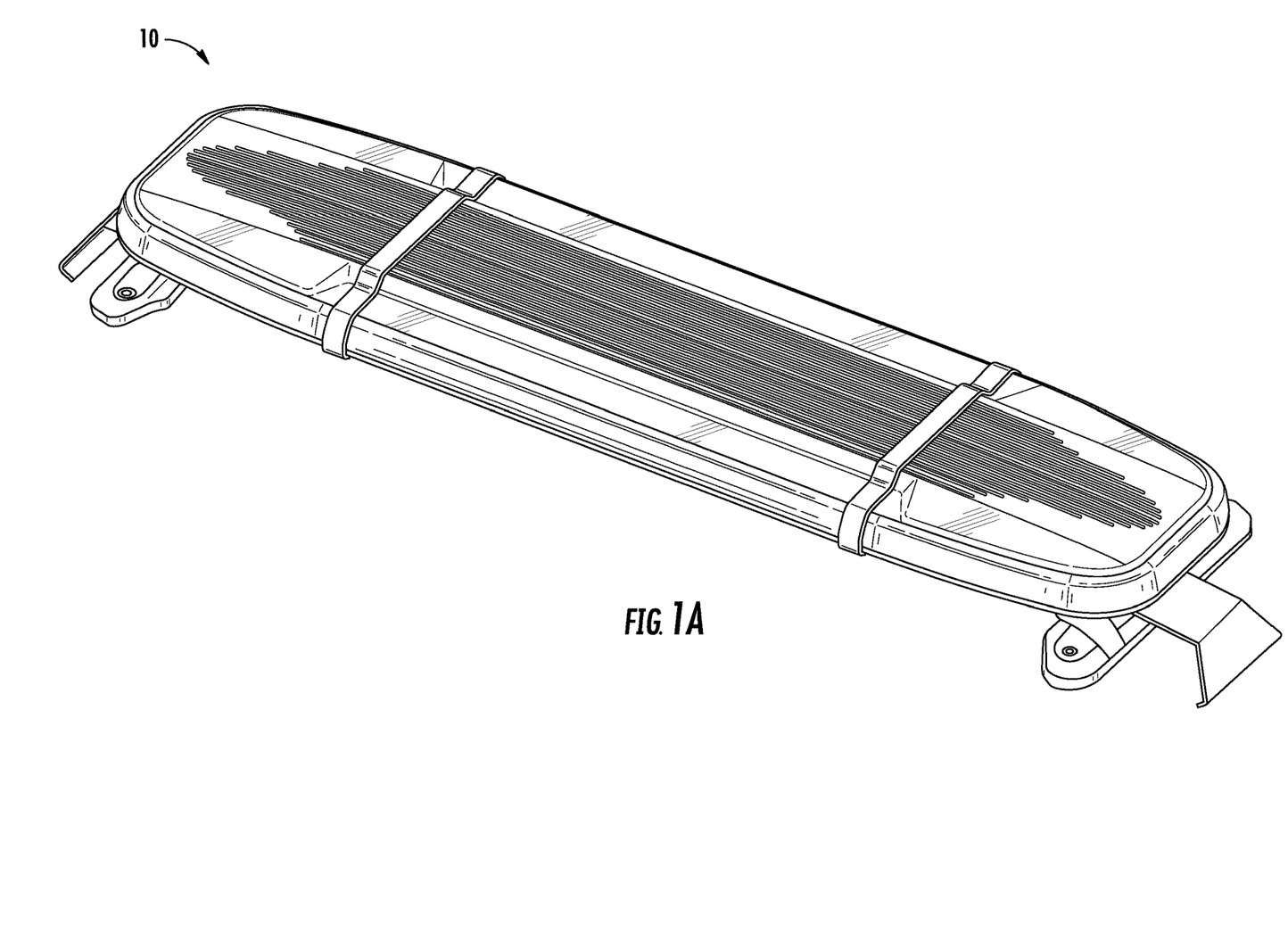
FIG. 1A is a perspective view of a representative modular enclosure with water management mating interfaces in the form of a lightbar (hereafter, "the lightbar enclosure") according to aspects of the disclosure.
Figure 1B:
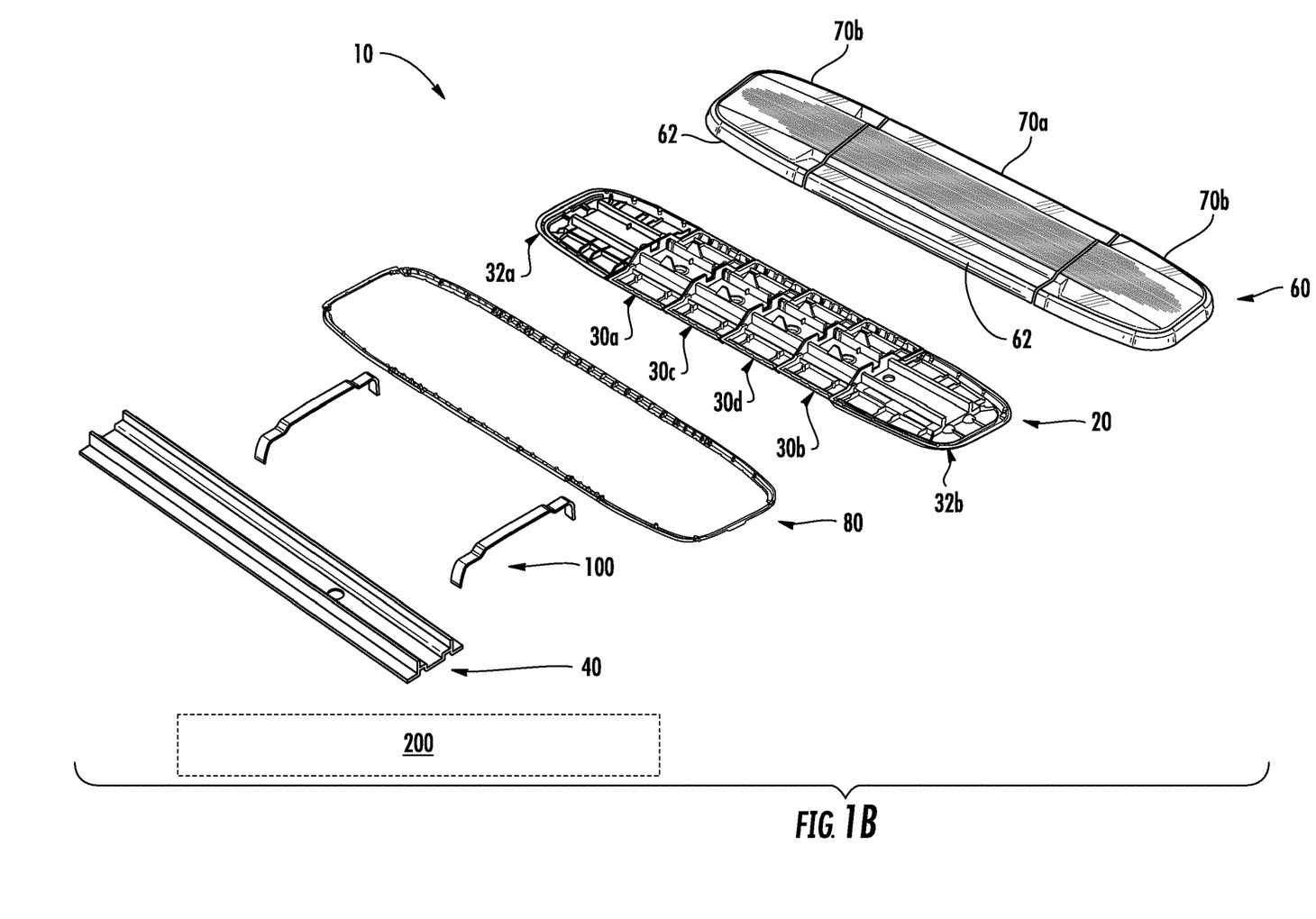
FIG. 1B is a perspective exploded view of the lightbar enclosure of FIG. 1A.
Figure 1C:
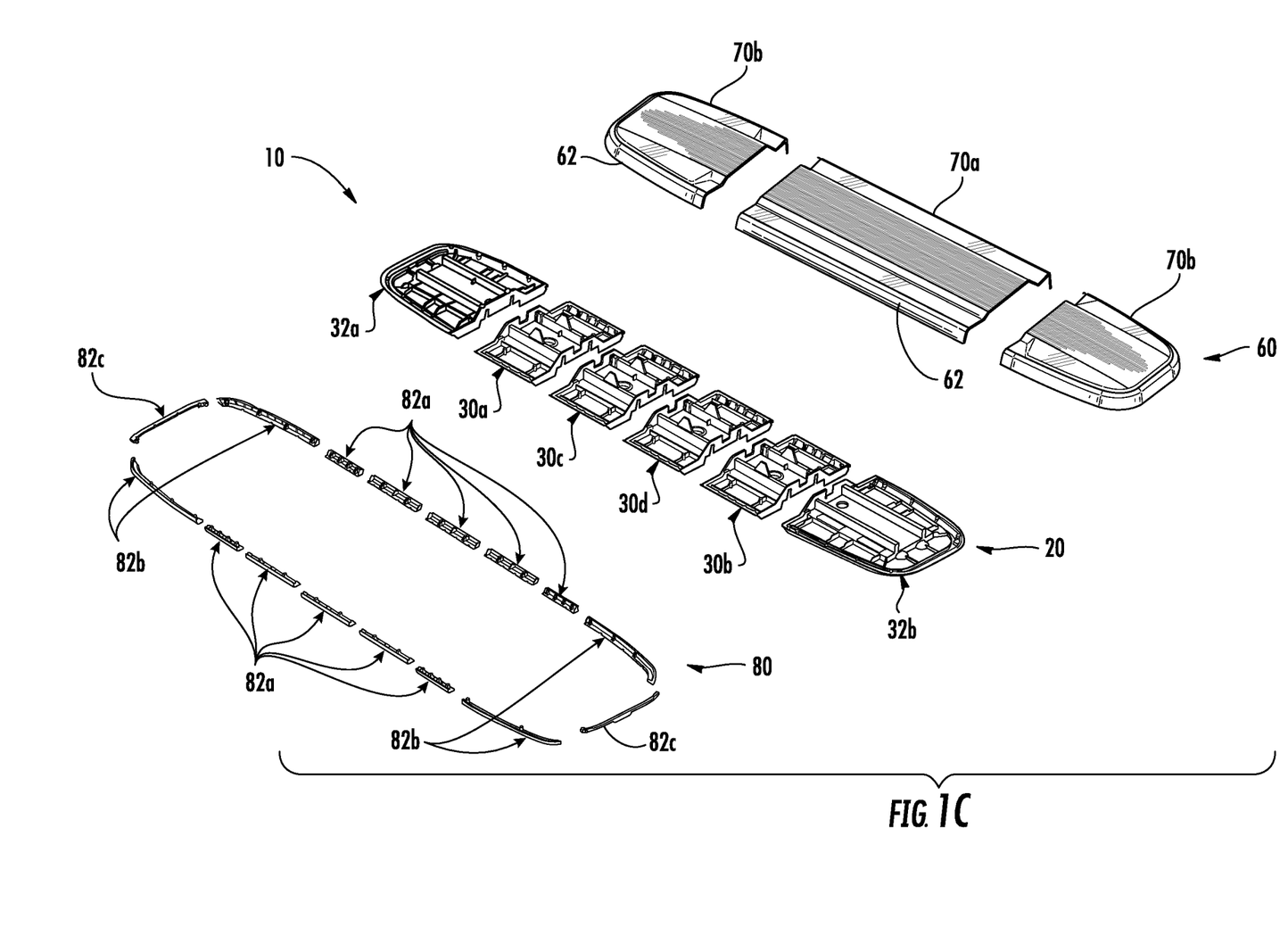
FIG. 1C is a perspective exploded view of the dome assembly, base assembly, and retainer assembly of FIG. 1B, showing the constituent parts of these assemblies separated from each other.

As shown in FIGS. 1A, 1B and 1C, with reference to one embodiment, the lightbar enclosure 10 includes a plastic modular base assembly 20 that serves as part of a housing for the electrical and optical components of a lightbar. An extruded aluminum spine 40 extends beneath and connects the base assembly 20. A retainer assembly 80 is secured to the periphery of the base assembly 20 to form a peripheral channel 120 (see FIG. 6). A plastic dome assembly 60 is received in the channel 120 and encloses the lightbar to define an interior of the housing with the base assembly 20. Generally speaking, the lightbar enclosure 10 is illustrated and discussed for assembly in a horizontal orientation along a longitudinal axis with the dome assembly 60 positioned above the base assembly 20.

Referring to FIG. 1B, the base assembly 20 is comprised of four intermediate bases (30a, 30b, 30c, 30d) disposed adjacently in a side-by-side arrangement between first and second end bases 32a, 32b. Shown in FIGS. 2A-3B, each intermediate base (30a, 30b, 30c, 30d) includes mating interfaces at opposing end faces and at a periphery extending between each end face. Each end base 32a, 32b includes a mating interface at one end face and at a periphery extending from the end face. The mating interfaces are interlocked with complementary adjacent mating interfaces to form a unitary base assembly 20. The mating interface at the periphery of the base assembly 20 is configured to mate with the dome assembly 60 and retainer assembly 80. Upon interlocking of the base assembly 20, a joint 31 (see FIG. 6) is defined between each adjacent intermediate base (30a, 30b, 30c, 30d) and between intermediate bases 30a, 30b and the end bases 32a, 32b. FIG. 1C shows the components of the dome assembly 60, base assembly 20 and retainer assembly 80 separated from each other.

Figure 2A:
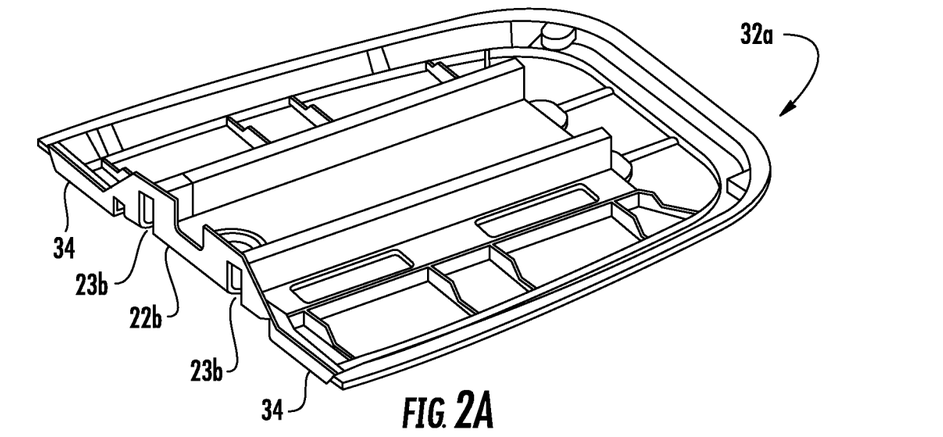
FIG. 2A is a perspective view of an end base which is part of a base assembly in the lightbar enclosure of FIG. 1A.
Figure 2B:
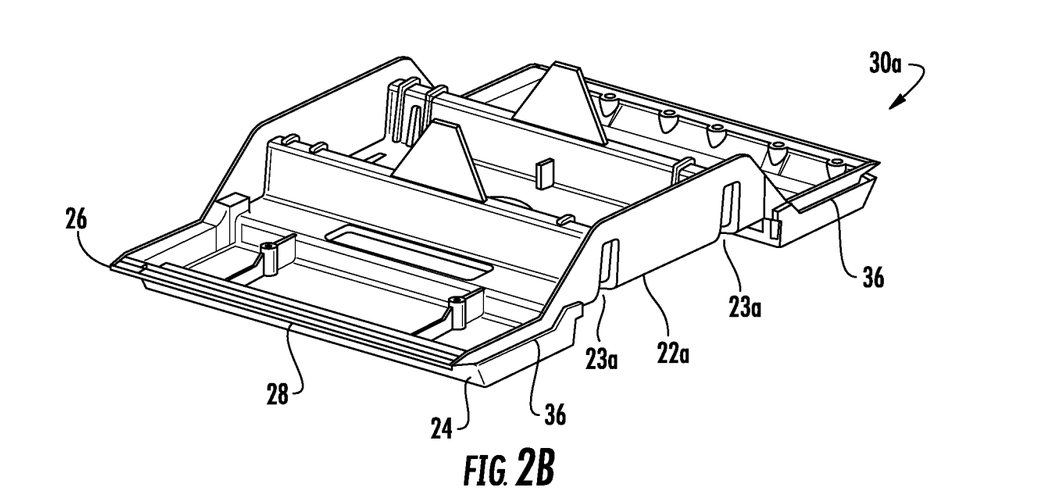
FIG. 2B is a perspective view of an intermediate base which is part of the base assembly in the lightbar enclosure of FIG. 1A.
Figure 2C:
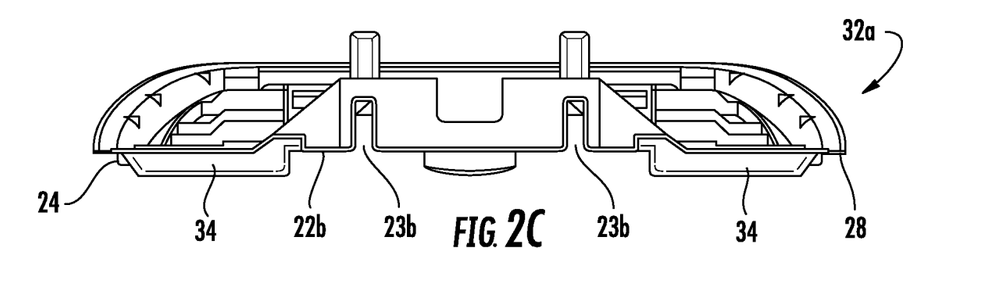
FIG. 2C is a left end view of the end base of FIG. 2A.
Figure 3A:
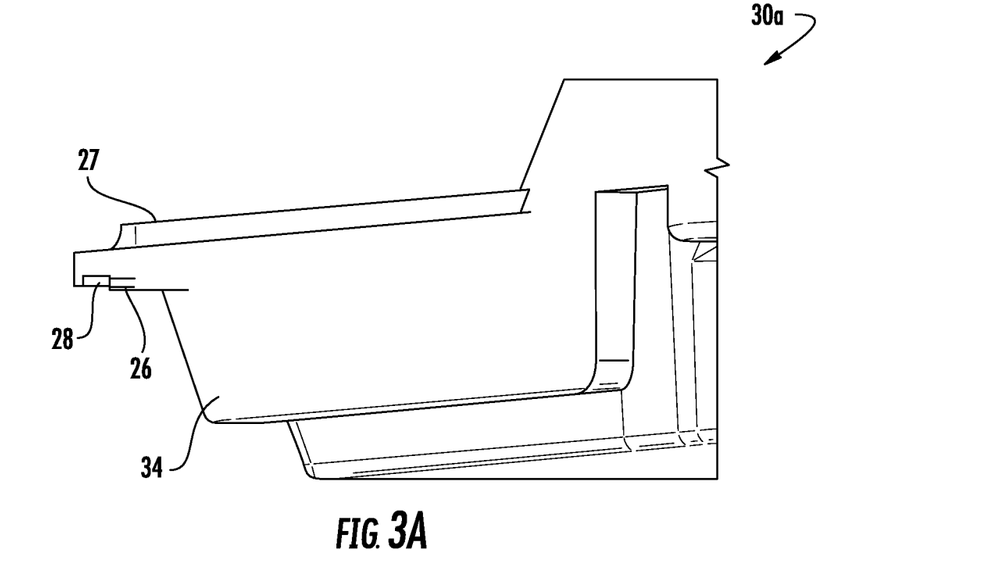
FIG. 3A is a partial perspective view with emphasis on a tongue of the end base of FIG. 2A used for interlocking the base assembly of the lightbar enclosure in FIG. 1A.
Figure 3B:
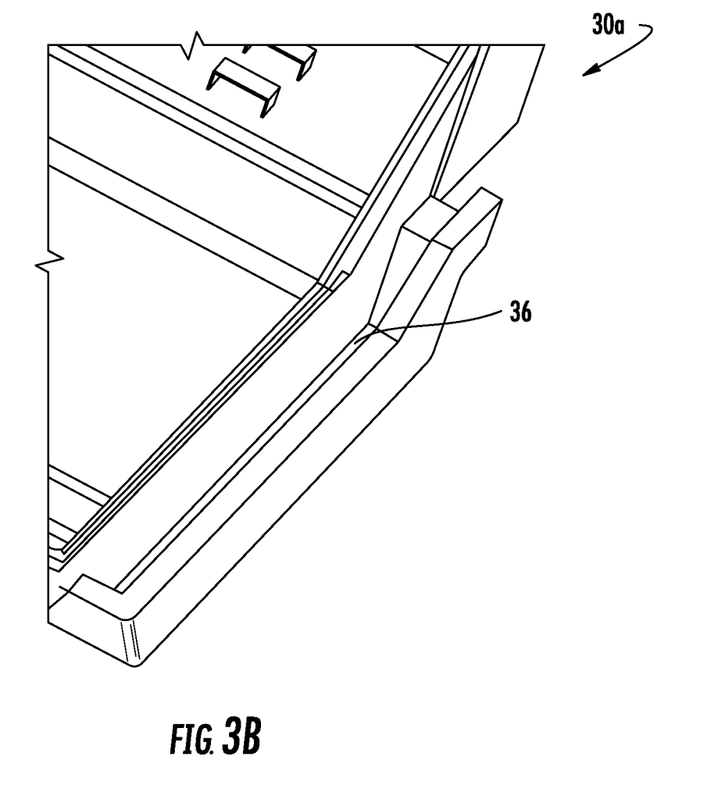
FIG. 3B is a partial perspective view with emphasis on a groove of the intermediate base of FIG. 2A used for interlocking the base assembly of the lightbar enclosure in FIG. 1A.
Figure 4:
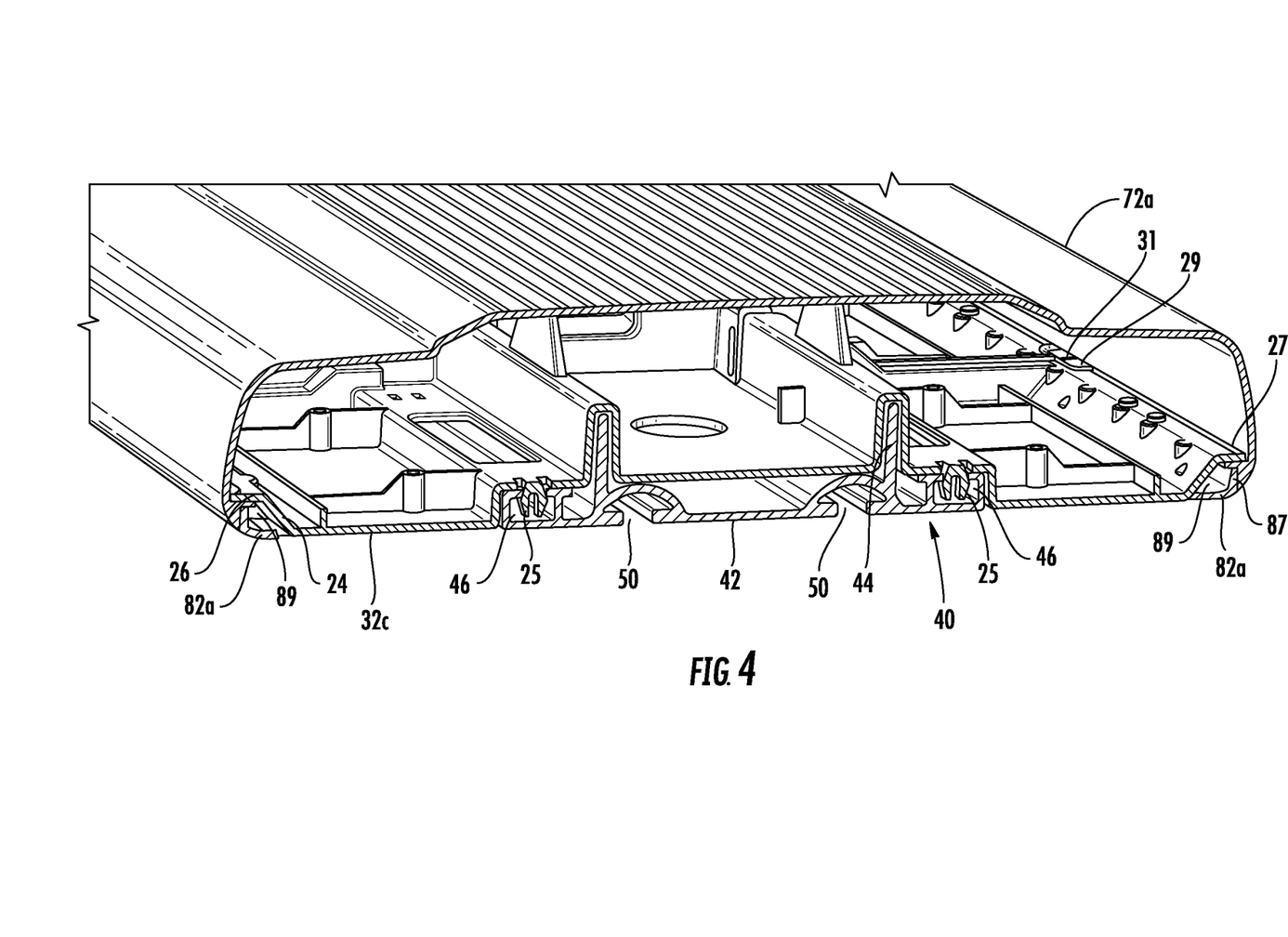
FIG. 4 is a perspective cross-sectional view of the lightbar enclosure of FIG. 1A.

Referring to FIGS. 2A-2C, the underside of each intermediate base (30a, 30b, 30c, 30d) defines a longitudinally extending recess 22a spanning the entire length of each intermediate base (30a, 30b, 30c, 30d). The underside of each end base 32a, 32b defines a longitudinally extending recess 22b that spans more than half of the length of each end base 32a, 32b. Each recess 22a, 22b is configured to receive the spine 40. Each recess in the intermediate bases 22a and each recess in the end bases 22b include a pair of longitudinally extending and laterally spaced slits 23a, 23b, respectively, for mating with the spine 40. As seen in FIG. 4, a plurality of Fastex™ screw grommets 25 extend downward into each recess 22a, 22b for engaging the spine 40.

Figure 10:
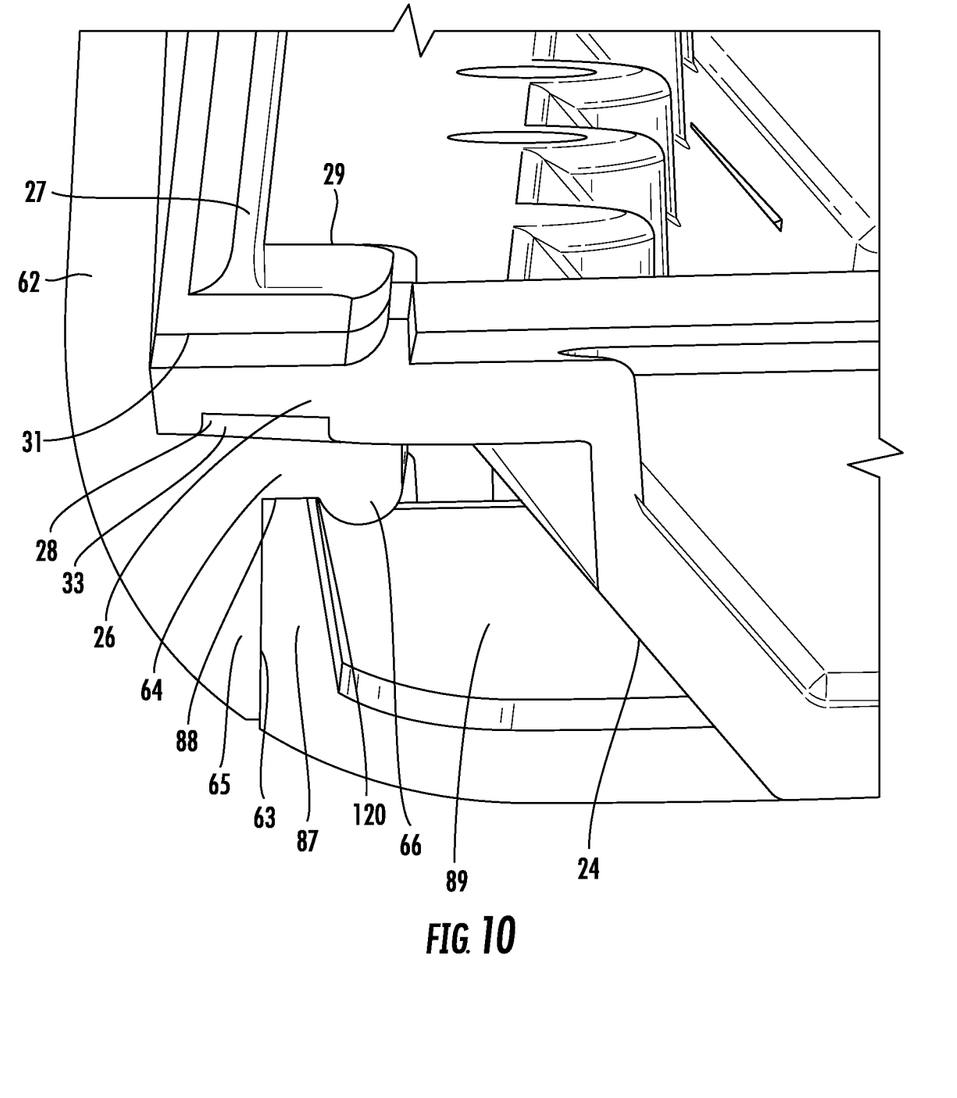
FIG. 10 is a partial cross-sectional view with emphasis on a connection between an intermediate base, a side retainer, and a dome from the lightbar enclosure of FIG. 1A.
Figure 11:
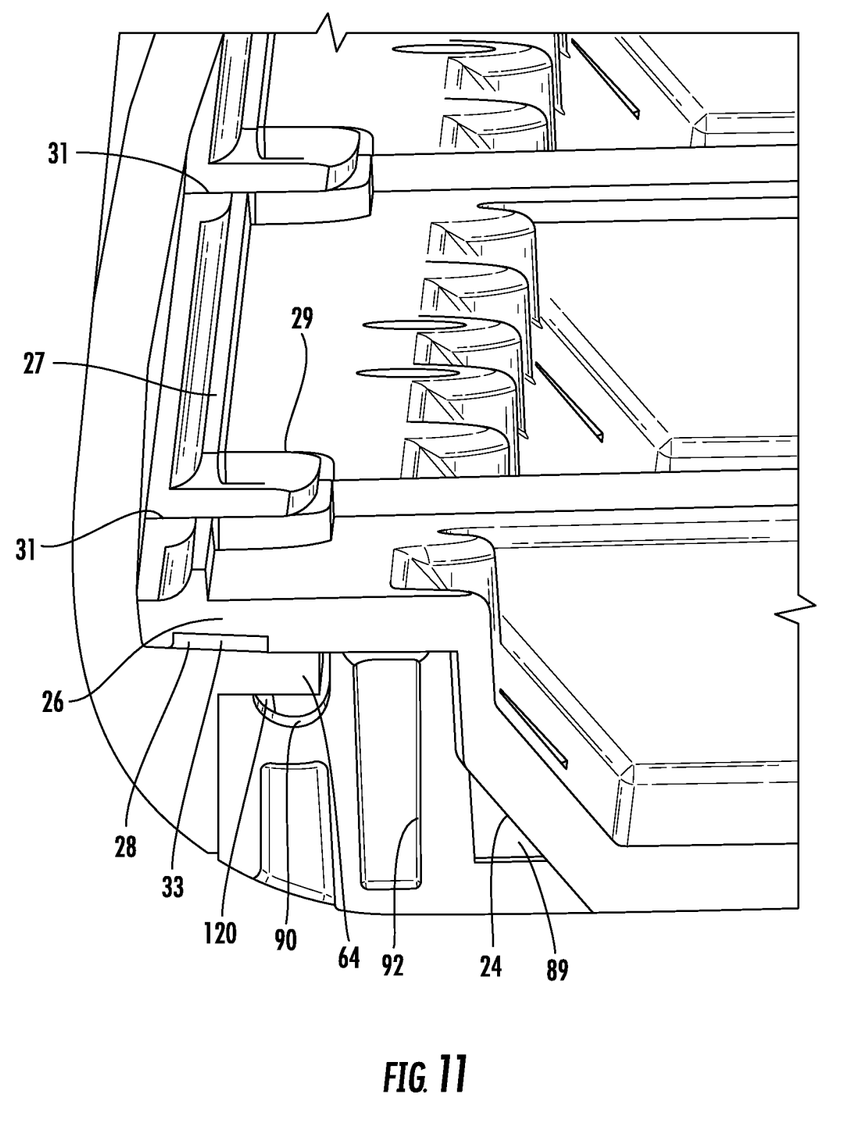
FIG. 11 a partial cross-sectional view with emphasis on a connection between an intermediate base, a side retainer, and a dome from the lightbar enclosure FIG. 1A.

As shown in FIGS. 4, 10, and 11, the underside of each intermediate base (30a, 30b, 30c, 30d) and each end base 32a, 32b includes an angled peripheral face 24 leading to an outwardly projecting lip 26. Each lip 26 defines a slot 28 on a lower portion for forming a drain path 33 between each lip 26 and the dome assembly 60 upon assembly of the lightbar enclosure 10. A dam 27 extends along an upper portion of each lip 26 for blocking water at the periphery of the base assembly 20. The dam 27 widens at the ends of each intermediate base (30a, 30b, 30c, 30d) and the inner ends of each end base 32a, 32b to form a water reservoir 29 which surrounds each corresponding joint 31 formed when the base assembly 20 is interlocked. Each joint 31 is in communication with each corresponding slot 28. When water collects in each reservoir 29 the corresponding joint 31 provides an opening to the corresponding drain path 33 for water to exit the housing.

As shown in FIGS. 2A-3B, the mating interfaces of each intermediate base (30a, 30b, 30c, 30d) are comprised of an end face of each intermediate base (30a, 30b, 30c, 30d) having a pair of interlockable tongues 34 and an opposing end face of each intermediate base (30a, 30b, 30c, 30d) defining a pair of grooves 36 complementary to the tongues 34. The first end base 32a includes a pair of tongues 34 for interlocking with corresponding grooves 36 defined by the first intermediate base 30a. The second end base 32b defines a pair of grooves 36 for interlocking with corresponding tongues 34 included on the second intermediate base 30b. The tongues 34 of the first intermediate base 30a interlock with corresponding grooves 36 defined by the third intermediate base 30c. The grooves 36 defined by the second intermediate base 30b interlock with the tongues 34 of the fourth intermediate base 30d and the grooves 36 of the fourth intermediate base 30d interlock with the tongues 34 of the third intermediate base 30c. In this arrangement, the base assembly 20 forms a unitary interlocked part of the housing.

Figure 5:
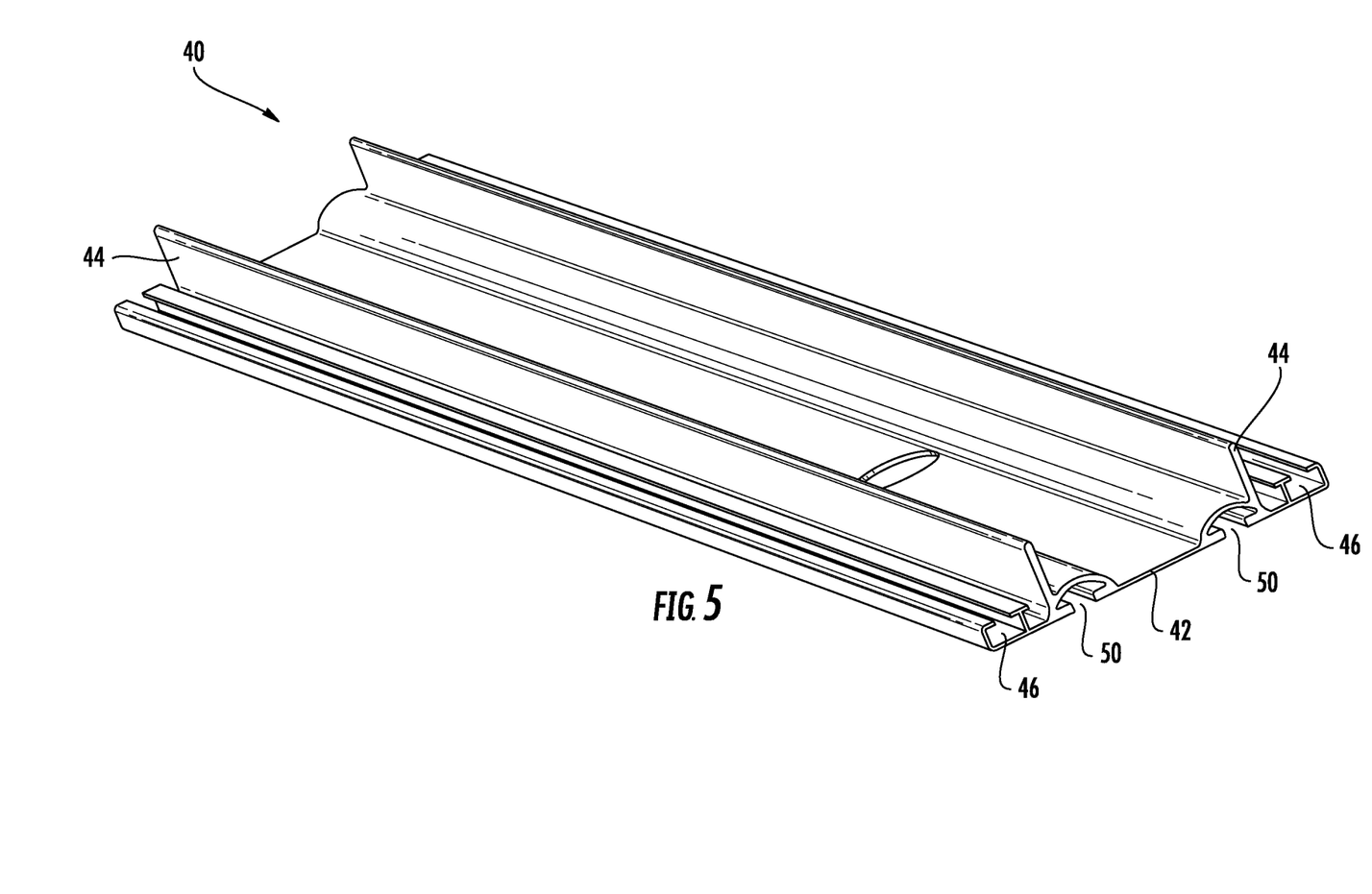
FIG. 5 is a perspective view of a spine for supporting and connecting the base assembly of the lightbar enclosure of FIG. 1A.

As shown in FIGS. 4 and 5, the spine 40 functions as a support member positioned in each recess 22a, 22b defined at the underside of each intermediate base (30a, 30b, 30c, 30d) and each end base 32a, 32b, respectively. When the lightbar enclosure 10 is fully assembled, the spine 40 extends longitudinally through the base assembly 20 and terminates at a point adjacent an outer end of each end base 32a, 32b. The spine 40 includes a platform 42 having a pair of strengthening ribs 44 configured to mate with the slits 23a, 23b in the base assembly 20. The ribs 44 project upward perpendicular to the platform 42 and extend longitudinally along the entire length of the spine 40. The ribs 44 are laterally spaced and run parallel to each other. A longitudinally extending track 46 is defined laterally outside of each rib 44 for receiving the grommets 25 projecting from the base assembly 20. A longitudinally extending arcuate track 50 is defined laterally inside of each rib 44 for accommodating fastener heads from below.

Figure 6:
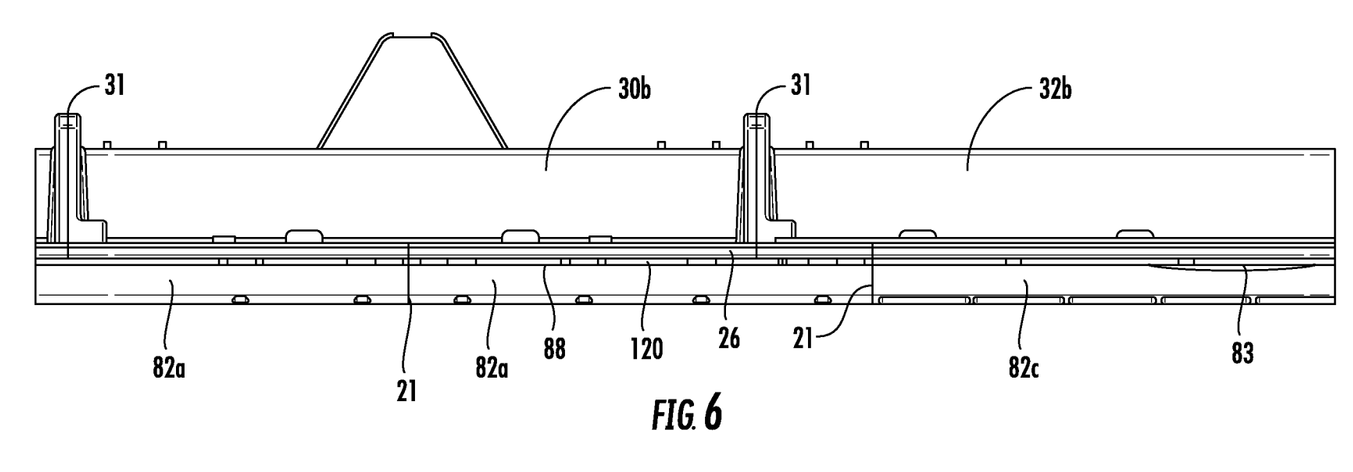
FIG. 6 is a partial front view with emphasis on a retainer assembly secured to the base assembly in the lightbar enclosure of FIG. 1A.
Figure 7A:
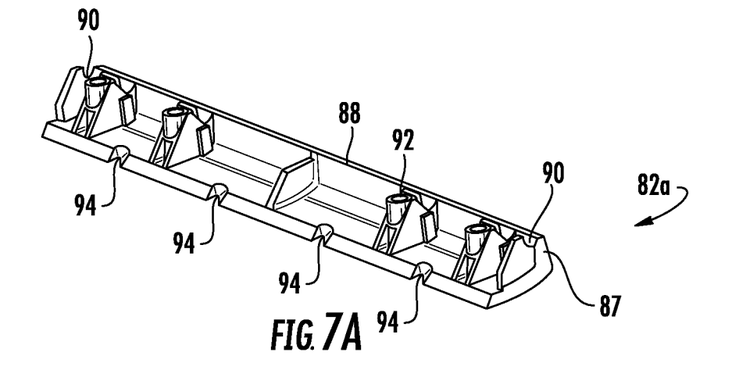
FIG. 7A is a perspective view of a side retainer from the retainer assembly in the lightbar enclosure of FIG. 1A.
Figure 7B:
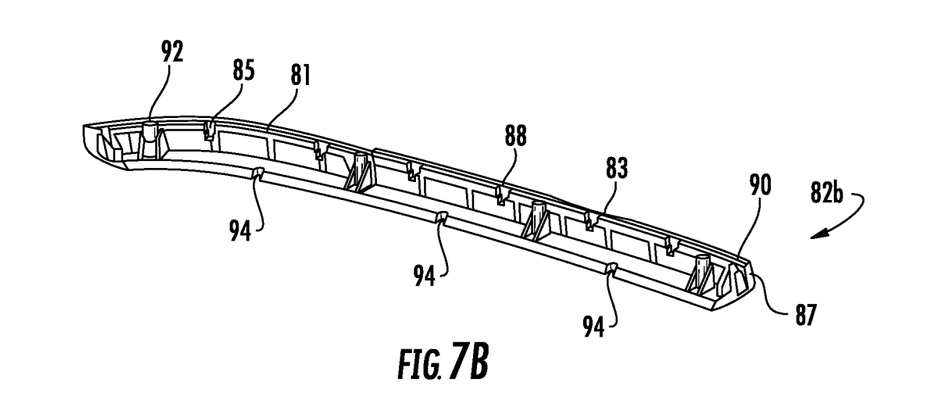
FIG. 7B is a perspective view of a corner retainer from the retainer assembly in the lightbar enclosure of FIG. 1A.
Figure 7C:
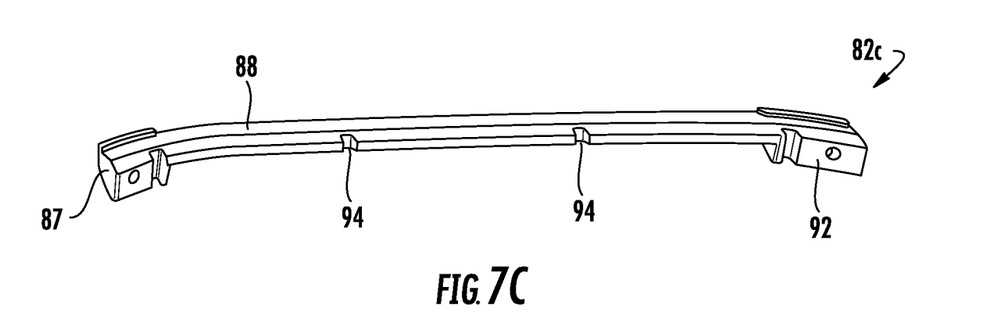
FIG. 7C is a perspective view of an endcap retainer from the retainer assembly in the lightbar enclosure of FIG. 1A.

As shown in FIGS. 1B and 6, the retainer assembly 80 is configured to secure to the corresponding angled peripheral faces 24 of the underside of the base assembly 20. Referring to FIGS. 7A-7C, the retainer assembly 80 is comprised of a plurality of side retainers 82a for securing to opposing sides of intermediate bases (30a, 30b, 30c, 30d) and opposing sides of the end bases 32a, 32b, corner retainers 82b for securing to opposing sides and opposing corners of the end bases 32a, 32b, and endcap retainers 82c for securing to the outer ends of the end bases 32a, 32b. As illustrated in FIGS. 1B and 6, the retainer assembly 80 is secured to the base assembly 20 in side-by-side arrangement. Upon assembly, a passage 21 is formed between each adjacent retainer (82a, 82b, 82c). Each passage 21 between adjacent retainers (82a, 82b, 82c) is longitudinally offset from the joints 31 defined by the base assembly 20 to obstruct upward water travel into the housing. When the lightbar enclosure 10 is assembled, the joints 31, drain path 33, and passages 21 provide pathways to facilitate the movement water downward out of the housing due to gravity and a Venturi-like effect.

In the disclosed embodiment, there are ten side retainers 82a, four corner retainers 82b and two endcap retainers 82c. As seen in FIGS. 7A-7C, 10 and 11, each retainer (82a, 82b, 82c) includes a border 87 leading to a seat 88. As shown in FIGS. 6, 10 and 11, when the retainer assembly 80 is secured to the base assembly 20, a spaced relationship between each lip 26 and each seat 88 defines a peripheral channel 120 for receiving the dome assembly 60. The channel 120 has a height of greater than 0.5 millimeters. A cavity 89 is defined between each border 87 and the angled peripheral face 24 of the base assembly 20 for water collection.

As shown in FIGS. 6-7C, the side retainers 82a and corner retainers 82b include notches 90 for slidably receiving and guiding the dome assembly 60 and bosses 92 for receiving fasteners which are inserted through corresponding holes in the base assembly 20. The border 87 of each corner retainer 82b defines an entrance 83 extending into each notch 90 for receiving and guiding the dome assembly 60. Each corner retainer 82b includes an inner rim 81 defining a plurality of water drainage spouts 85. Upon assembly of the lightbar enclosure 10, each cavity 89 cooperates with the spouts 85, the passages 21, the drain path 33, and the joints 31 to drain water from the lightbar enclosure 10. As seen in FIGS. 7A-7C, water is drained through a plurality of water drainage holes 94 at the underside of each retainer (82a, 82b, 82c) in fluid communication with the cavity 89.

Referring to FIGS. 1A and 1B, the dome assembly 60 is comprised of a middle dome 70a disposed adjacently between two end domes 70b. Each dome 70a and 70b includes a stepped top portion extending to peripheral walls 62 configured to overlap the lip 26 of each intermediate base (30a, 30b, 30c, 30d) and each end base 32a, 32b. Each peripheral wall 62 extends down to an inwardly projecting flange 64 that is received between the retainer assembly 80 and the base assembly 20. Each peripheral wall 62 extends down to a bottom edge 65 spaced apart from and below each flange 64. As seen in FIGS. 10 and 11, upon assembly, a vertical gap 63 is defined between a vertical surface-to-surface relationship between each bottom edge 65 and each border 87 of the retainer assembly 80. As illustrated in FIG. 6, the passages 21 are defined adjacent to and in fluid communication with the vertical gap 63. Each flange 64 includes a series of discontinuous beads 66 for holding and guiding the connection between the dome assembly 60, the base assembly 20, and the retainer assembly 80. As shown in FIGS. 6 and 7B, each entrance 83 defined by the corner retainers 82b is configured to receive the beads 66 and the notches 90 are configured to guide the beads 66.

Figure 8:
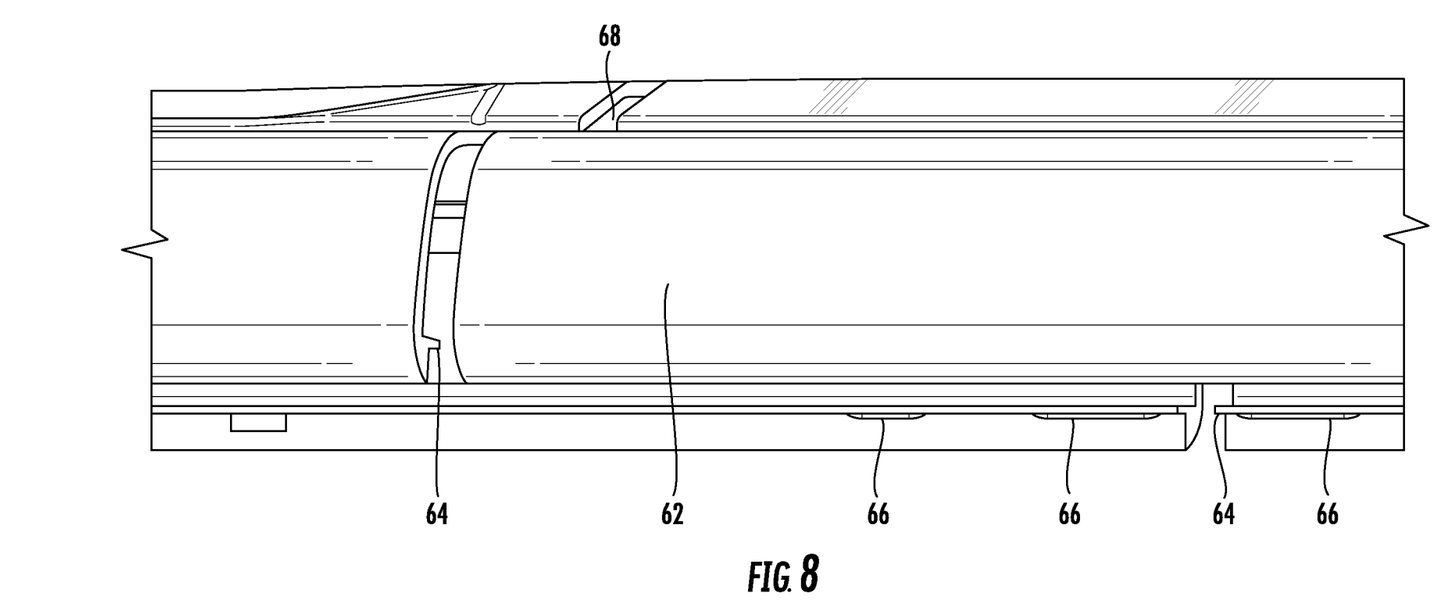
FIG. 8 is a partial perspective view with emphasis on a dome assembly from the lightbar enclosure of FIG. 1A.
Figure 9A:
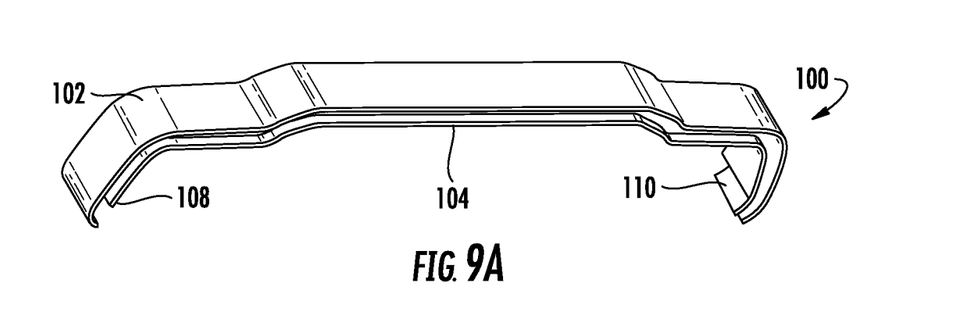
FIG. 9A is a perspective view of a seal assembly from the lightbar enclosure of FIG. 1A.
Figure 9B:
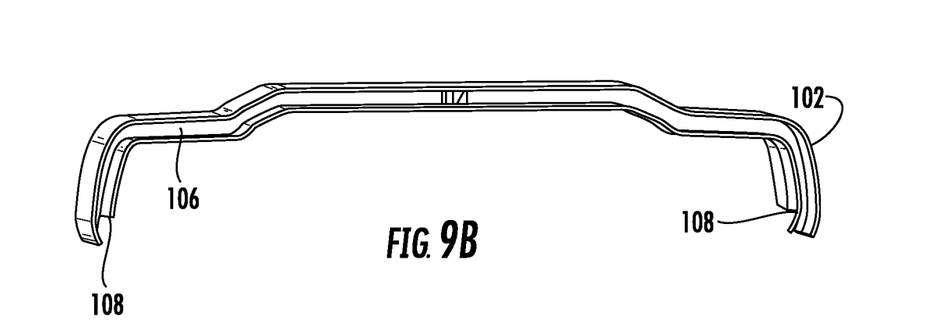
FIG. 9B is a perspective view of a divider from the seal assembly of FIG. 9A.
Figure 9C:
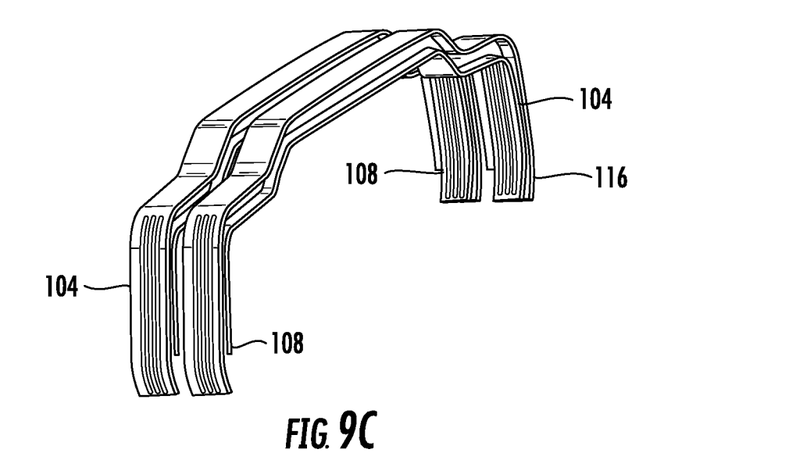
FIG. 9C is a perspective view of a pair of seals from the seal assembly of FIG. 9A.

As shown in FIG. 8, a gap 68 is defined between the middle dome 70a and each end dome 70b which extends transversely through the longitudinal axis of the lightbar enclosure 10. A divider seal assembly 100, illustrated in FIGS. 9A-9C, is configured to span each gap 68 between the middle dome 70a and each corresponding adjacent end dome 70b. Each divider seal assembly 100 includes a plastic divider 102 and a pair of elastomeric seals 104 which cooperate to sealingly engage the middle dome 70a and each corresponding adjacent end dome 70b. Each divider 102 is generally I-shaped and includes a substantially flat top wall, a substantially flat bottom wall, and a center wall connecting the top and bottom walls. The walls define a pair of parallel slots 106 on opposing sides of each divider 102 for receiving the seals 104. Each seal 104 is also generally I-shaped and includes a substantially flat top wall, a substantially flat bottom wall, and an inner wall connecting the top and bottom walls. The walls of the seals 104 define slots for receiving the domes 70a, 70b. The dividers 102 and the seals 104 include a stepped portion complementary to the stepped top portion of the domes 70a, 70b.

Each divider 102 retains corresponding seals 104. Each seal 104 fits into corresponding parallel slots 106. In this arrangement, the middle dome 70a fits into one side of each divider seal assembly 100 and the corresponding end dome 70b fits into the other side of the corresponding divider seal assembly 100. Each divider 102 and each seal 104 include cutouts 108 at lower opposing ends for abutting a corresponding lip 26 of the base assembly 20.

As illustrated by FIGS. 1A and 1B, during assembly the spine 40 and retainer assembly 80 are positioned on a fixture 200. The base assembly 20 is placed onto the spine 40 from left to right, from end base 32a to end base 32b, with each respective intermediate base (30a, 30b, 30c, 30d) positioned in between and each tongue 34 interlocking with a corresponding groove 36 as described above. As seen in FIG. 4, the grommets 25 projecting from the base assembly 20 are positioned in the tracks 46 of the spine 40. Referring to FIGS. 6, 10 and 11, the side and corner retainers 82a, 82b are secured to the angled peripheral face 24 of the base assembly 20. Fasteners extend through the base assembly 20 and are received by the grommets 25 and the bosses 92 of the retainers (82a, 82b, 82c).

As shown in FIGS. 10 and 11 and described above, the connection between the base assembly 20 and the retainer assembly 80 forms the peripheral channel 120 between each lip 26 in the base assembly 20 and each seat 88 in the retainer assembly 80 for slidably receiving a corresponding flange 64 projecting from the dome assembly 60. The beads 66 on each flange 64 are inserted into the entrance 83 defined by each border 87 of opposing corner retainers 82b. The beads 66 are guided rearward of each seat 88 in the retainer assembly 80 to hold the connection between the dome assembly 60 and the channel 120 while also guiding the domes 70a, 70b within the channel 120. The divider seal assembly 100 is positioned between the middle dome 70a and each corresponding end dome 70b as each dome 70a, 70b is inserted into the channel 120.

In this arrangement, each flange 64 is sandwiched between corresponding seats 88 present on the borders 87 of the retainer assembly 80 and corresponding lips 26 of the base assembly 20 in a horizontal surface-to-surface relationship. The drain path 33 is formed when each flange 64 closes off a corresponding slot 28 by a horizontal surface-to-surface relationship between each flange 64 and a corresponding lip 26. The borders 87 are engaged in a surface-to-surface relationship with corresponding bottom edges 65 of the dome assembly 60 that is substantially perpendicular to the surface-to-surface relationship between the seats 88 and each corresponding flange 64. The joints 31 are positioned above and fluidically communicate with the drain path 33 and the drain path 33 is positioned above and fluidically communicates with the cavity 89. The cavity 89 fluidically communicates with the passages 21 and the drainage holes 94. Water that collects in the cavity 89 via the drain path 33 exits through the passages 21 and/or the drainage holes 94 by way of the force of gravity and/or a Venturi-like effect created by air flow around the lightbar enclosure 10. The joints 31 are longitudinally offset from the passages 21. This configuration obstructs water from entering the housing and provides multiple vertical pathways to facilitate water exiting the housing.

While a preferred embodiment of the disclosed modular enclosure with water management mating interfaces has been set forth for purposes of illustration, the foregoing description should not be deemed a limitation of the invention. Accordingly, various modifications, adaptations and alternatives may occur to one skilled in the art without departing from the spirit of the disclosure and the scope of the claimed coverage.

What is claimed:

1. A warning light enclosure comprising:
   a modular base including a plurality of base modules, each base module having at least one end face and a periphery extending from said end face, the periphery including an outward projecting lip, said plurality of base modules connected with said end faces abutting each other to form said modular base with the outward projecting lips of adjacent base modules aligned in a common plane;
   a plurality of retainers secured to said modular base below the lips of said base modules, said retainers and said lips defining a channel extending along at least part of a longitudinal side of said modular base and a cavity between each said retainer and an outside surface of said modular base below said lip, each said retainer including at least one drainage hole, said channel, said cavity and said drainage holes being in fluid communication to define a drain path;
   a light transmissive dome including a plurality of dome portions, each dome portion having longitudinal sides, each longitudinal side terminating in a bottom edge and including a flange projecting inwardly from said longitudinal sides at a position spaced above said bottom edge;
   wherein the flange of each dome portion is received in said channel to retain said dome portions to said modular base to define an interior space configured to retain a lighting device and said drain path to facilitate water exiting said interior space.

2. The warning light enclosure of claim 1, wherein each said retainer includes a border substantially perpendicular to said lip and spaced apart from a bottom surface of said lip to define said cavity.

3. The warning light enclosure of claim 1, wherein said base modules interlock with each other at said abutting end faces to form a base joint, each said base joint in fluid communication with interior space and said drain path.

4. The warning light enclosure of claim 1, wherein said base modules interlock with each other at said abutting end faces to form a base joint, each retainer has longitudinal retainer ends, the longitudinal ends of adjacent retainers forming a retainer joint, said retainer joints being longitudinally offset from said base joints.

5. The warning light enclosure of claim 1, wherein said base modules interlock with each other at said abutting end faces to form a base joint, each retainer has longitudinal retainer ends, the longitudinal ends of adjacent retainers forming a retainer joint, said retainer joints being longitudinally offset from said base joints.

6. A lightbar enclosure comprising:
   a base constructed of at least two base modules connected at abutting end faces to form at least one base joint, each said base module having an outwardly projecting lip perpendicular to said base joint;
   at least one dome portion positioned above the base to define an interior space configured to retain a lighting device, said dome portion having a top wall and side walls projecting downwardly from said top wall, said side walls including an inwardly projecting flange and a bottom edge extending below the flange,
   a plurality of side retainers secured to said base below said lip along longitudinal sides of said lightbar enclosure, each of said side retainers having a border, the side retainers and an outside surface of said base below said lip defining a channel between the lip and the border;
   wherein, each flange is received in the channel, the flange engaged in a surface-to-surface relationship with the lip and the border engaged in a surface-to-surface relationship with said side walls below said flange, said flange, border, and outside surface of said base below said lip defining a cavity in fluid communication with said base joint to define a drain path from said interior space to an area outside said lightbar enclosure.

7. The lightbar enclosure of claim 6, wherein the surface-to-surface relationship of flange and the lip is perpendicular to the surface-to-surface relationship of the border and the side walls below said lip.

8. The lightbar enclosure of claim 6, wherein the plurality of base modules includes a plurality of intermediate base modules positioned adjacently between a pair of end bases to form a plurality of base joints, said plurality of base modules interlocking with each other at said end faces.

9. The lightbar enclosure of claim 8, wherein the intermediate bases include a first end face having a pair of tongues and a second end face having a pair of grooves, said tongues received in the grooves of an adjacent intermediate base or end base.

10. The lightbar enclosure of claim 6, wherein outward projecting lip of the base has a top surface, a bottom surface and an outer edge extending between said top and bottom surfaces, said lip includes an upwardly projecting dam on said top surface and a slot on said bottom surface, said slot in fluid communication with said at least one base joint between said outer edge and said dam to facilitate drainage from an area of said interior space above said lip and outward of said dam.

11. The lightbar enclosure of claim 6, wherein each side retainer has longitudinal retainer ends, the longitudinal retainer ends of adjacent side retainers forming a side retainer joint, said side retainers spanning said base joints so that said side retainer joints are longitudinally offset from said base joints.

12. The lightbar enclosure of claim 6, wherein the bottom of each side retainer defines at least one drainage hole.

13. The method of claim 12, wherein the step of providing a modular base comprises providing a plurality of base modules having end faces configured to interlock with the end face of an adjacent base module, and said method comprises interlocking each base module with at least one other adjacent base module to form said modular base.

14. The method of claim 12, wherein the step of providing at least one light transmissive dome portion comprises providing a plurality of light transmissive dome portions and inserting a divider seal between adjacent dome portions.

15. A method of manufacturing an enclosure for a warning light assembly comprising:

provigitng a modular base including a plurality of base modules, said plurality of base modules connected at abutting end faces to form at least one base joint, each said base module having an outwardly projecting lip perpendicular to said end face, with the outward projecting lips of adjacent base modules aligned in a common plane;

securing a plurality of retainers to the modular base below the lips of said base modules to define a channel between the lips of said base modules and the retainers;

providing at least one light transmissive dome portion having side walls terminating in a bottom edge and including an inward projecting flange spaced above said bottom edge;

inserting the flange in the channel to retain the dome to the base to define an interior space configured to retain at least one lighting device wherein an outside surface of said modular base below said outward projecting lips and said retainers define a cavity in fluid communication with said at least one base joint, said retainer and said outside surface defining a drain opening from said cavity below said lip and said flange, said drain opening in fluid communication with said cavity, said at least one base joint, cavity and drain opening defining a drain path from said interior space to an exterior of said enclosure below said modular base.

* * * * *